G. T. BUCKHAM.
ELEVATING AND SIGHTING APPARATUS OF FIELD GUNS.
APPLICATION FILED AUG. 6, 1910.
1,013,837.
Patented Jan. 2, 1912.
2 SHEETS—SHEET 1.
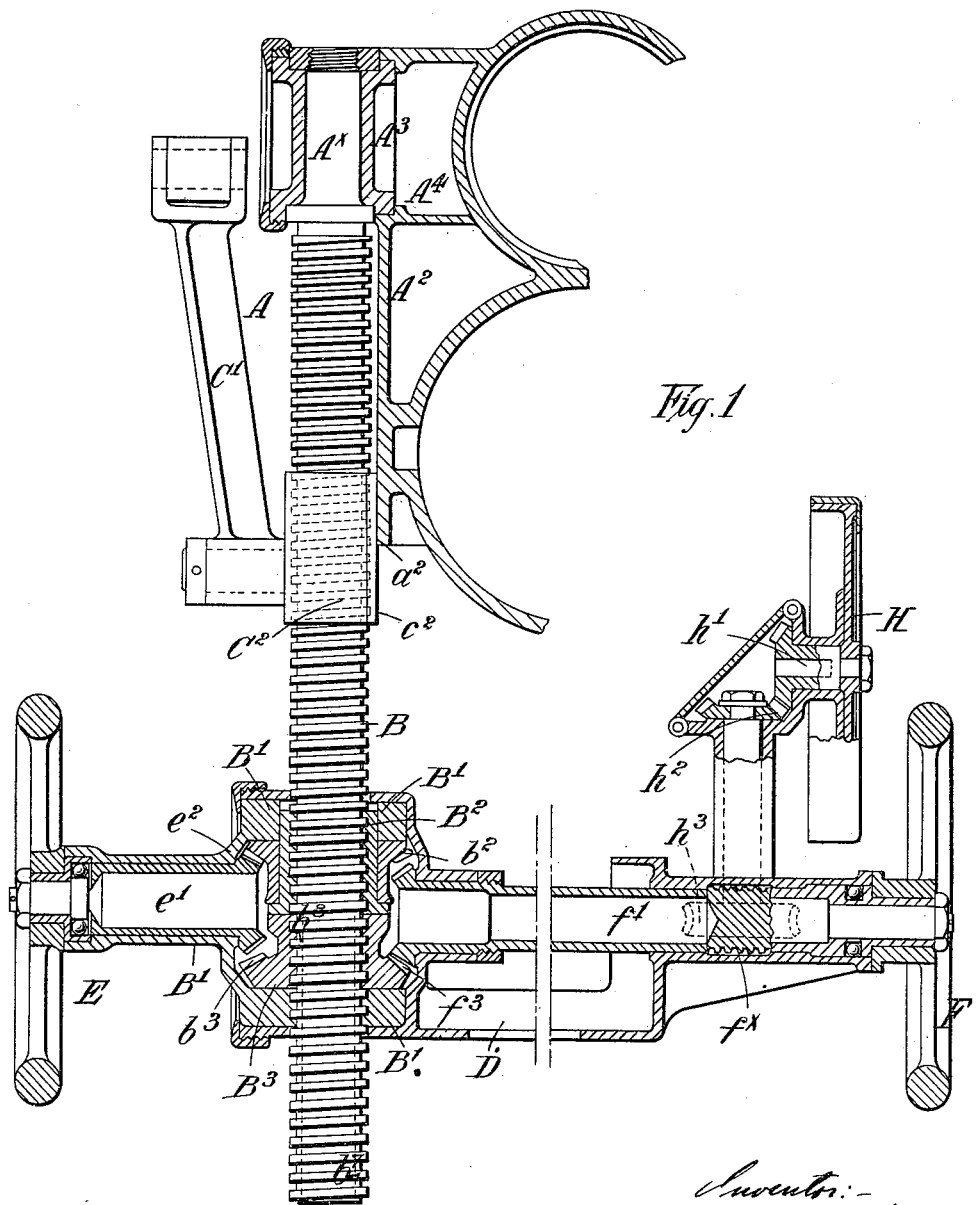

G. T. BUCKHAM.
ELEVATING AND SIGHTING APPARATUS OF FIELD GUNS.
APPLICATION FILED AUG. 6, 1910.
1,013,837.
Patented Jan. 2, 1912.
2 SHEETS—SHEET 2.
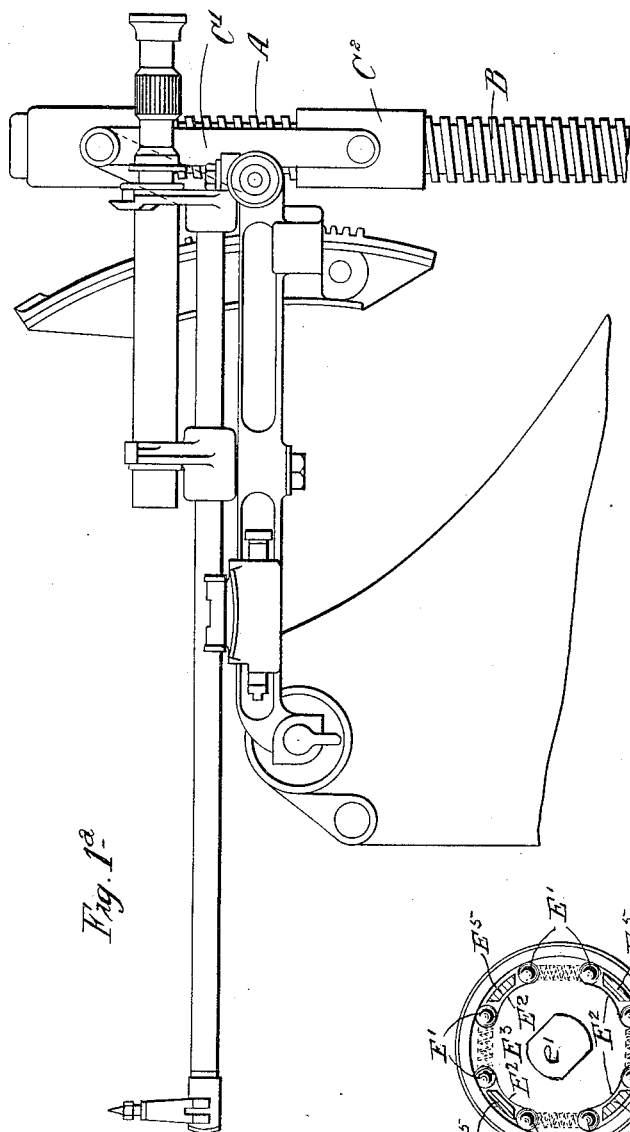
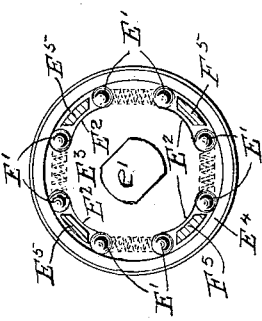

UNITED STATES PATENT OFFICE.

GEORGE THOMAS BUCKHAM, OF WESTMINSTER, LONDON, ENGLAND, ASSIGNOR TO VICKERS SONS & MAXIM LIMITED, OF WESTMINSTER, ENGLAND.

ELEVATING AND SIGHTING APPARATUS OF FIELD-GUNS.

1,013,837. Specification of Letters Patent. Patented Jan. 2, 1912.

Original application filed August 20, 1909, Serial No. 513,769. Divided and this application filed August 6, 1910. Serial No. 575,870.

*To all whom it may concern:*

Be it known that I, GEORGE THOMAS BUCKHAM, a subject of the King of Great Britain, residing at 32 Victoria street, Westminster, in the county of London, England, have invented certain new and useful Improvements in and Relating to the Elevating and Sighting Apparatus of Field-Guns, of which the following is a specification.

This invention relates to elevating and sighting apparatus of the kind in which the gun can be elevated together with the sighting apparatus, or independently thereof, a single screw effecting these pointing and ranging operations and the hand wheels operating the same being adapted to be actuated without changing the position of their axes relatively to each other or to the mounting. The disclosure shown herein forms a division from original United States application filed August 20, 1909, Serial No. 513,769. According to the present invention the said single ranging and pointing screw is connected to the gun cradle and engages with a sliding nut forming part of the sighting apparatus, means being provided whereby the said screw can be rotated without moving the sliding nut for the ranging operation or can be longitudinally displaced together with the said sliding nut for the pointing operation.

In order that my said invention may be clearly understood and readily carried into effect, I will describe the same more fully with reference to the accompanying drawings in which:—

Figure 1 is a vertical section of a form of the said gear and the single ranging and pointing screw, Fig. 1ª is a side view of Fig. 1 showing the sighting apparatus in position, and Fig. 2 is a view showing the automatic locking contrivance.

The ranging and pointing is accomplished by means of a single screw comprising two parts, A, B and I employ a box or casing B' which is situated near the lower end of the screw and pivotally connected with the trail D or other convenient part of the mounting. The said box or casing contains a rotary nut $B^2$ engaging with the threads of the screw and a rotary sleeve $B^3$ which is situated beneath and independent of the said nut, and which is connected with the screw by grooves and feathers $b^7$ $b^8$, but which has no screw-thread connection with the said screw. The said nut $B^2$ and the sleeve $B^3$ are also provided with bevel teeth $b^2$ $b^3$ engaging respectively with bevel pinions $e^2$ $f^3$ on the spindles $e'$ $f'$ of the pointing and ranging hand wheels E and F. When the pointing hand wheel E is operated it gives motion to the nut $B^2$ and thus causes the screw to travel up or down in the same without revolving and when the ranging hand wheel F is operated it gives motion to the sleeve $B^3$ and thus causes the screw to travel up or down by revolving in the nut $B^2$ which is at such time stationary. The connection between the screw and the sight bar is effected by means of the aforesaid pivoted arm or link C' and a sliding nut $C^2$ engaging with the screw about midway of its length, the said nut being free to move longitudinally but prevented from rotating by any suitable means such as flat faces $c^2$ thereon bearing against corresponding faces $a^2$ on the cradle $A^2$. The connection between the screw and the cradle is effected by making the upper end of the screw with a cylindrical stem $A^x$ which fits loosely in an angularly displaceable sleeve $A^3$ mounted in a socket $A^4$ carried by the gun cradle. It will thus be seen that when the said screw is moved longitudinally without revolving, which occurs when the pointing hand wheel E is operated, the said sliding nut $C^2$ moves with the screw and changes the elevation of the sight and the gun simultaneously, but that when the screw is revolved by the ranging hand wheel F, it does not move the sliding nut $C^2$ and consequently only changes the elevation of the gun.

When the screw is being actuated by the pointing hand wheel E through the rotary nut $B^2$ in the aforesaid box or casing B', it is necessary to prevent the rotary sleeve $B^3$ from being turned by the screw, and on the other hand when the screw is being actuated by the ranging hand wheel F through the rotary sleeve $B^3$ in the said box or casing, it is necessary to prevent the rotary nut $B^2$ from being turned by the screw. For this purpose I provide automatic locking contrivances or clamps of the well known kind that operate on the free-wheel clutch principles. Fig 2 shows the said contrivance which is shown as applied to the pointing hand wheel E, and comprises eight spring controlled balls E′ disposed between cam surfaces E² on a cam plate E³, and the inner circumferential wall of the casing E⁴. Disposed between each pair of balls is a projection E⁵ on the boss of the hand wheel E. When the latter is rotated, each of the projections E⁵ engages with one or other of its coöperating balls and moves it out of contact with the cam surface E². The further rotation of the hand wheel E effects the rotation of the spindle e′ (which is suitably connected to the cam plate) and the consequent actuation of the rotary nut B². Meanwhile the rotary sleeve B³ appertaining to the ranging gear remains held stationary by a similar automatic locking clamp appertaining to the ranging hand wheel F and its spindle f′, owing to the coöperation of each of the pairs of balls E′ with the cam surfaces E². When however the ranging hand wheel is actuated, its automatic locking clamp is released in an analogous manner to that above stated, and the rotary sleeve B³ is thus operated, the rotary nut B² meanwhile remaining held stationary by the locking clamp appertaining to the pointing gear. It will be obvious that the said rotary sleeve and rotary nut and the contrivances whereby one of these parts is kept stationary when the other is being actuated, could also be employed in connection with horizontally or approximately horizontally arranged pointing and ranging screws. The aforesaid automatic locking contrivances or clamps in themselves form no part of my invention and I make no specific claim thereto.

A range dial H may be provided adjacent to the ranging hand wheel F and be actuated by means of bevel gearing h′ h² that receives its motion from a worm wheel h³ driven by a worm f× on the ranging spindle f′. The range dial may be connected directly to the worm wheel if desired, or may be actuated from the sight bar.

What I claim and desire to secure by Letters Patent of the United States is:—

1. In elevating and sighting apparatus for ordnance, the combination with the trail of the gun and the ranging and pointing hand wheels mounted thereon, of a single ranging and pointing screw connected to the gun cradle, a sliding nut mounted on said screw, sighting apparatus connected with said sliding nut, means for rotating the screw without displacing the sliding nut for the ranging operation, and means for longitudinally displacing the said screw together with the sliding nut for the pointing operation.

2. In elevating and sighting apparatus for ordnance, the combination with the trail of the gun and the ranging and pointing hand wheels mounted thereon, of a single ranging and pointing screw connected to the gun cradle, a sliding nut mounted on said screw, sighting apparatus connected with said sliding nut, a rotary nut mounted on said screw and connected with the pointing hand wheel, a rotary sleeve also mounted on said screw and actuated by the ranging hand wheel, and means for connecting the rotary sleeve to the said screw so that the latter can be displaced longitudinally therethrough.

3. In elevating and sighting apparatus for ordnance, the combination with the trail of the gun and the ranging and pointing hand wheels mounted thereon, of a single ranging and pointing screw connected to the gun cradle, a sliding nut mounted on said screw, sighting apparatus connected with said sliding nut, a rotary nut mounted on said screw and connected with the pointing hand wheel, a rotary sleeve also mounted on said screw and actuated by the ranging hand wheel, means for connecting the rotary sleeve to the said screw so that the latter can be displaced longitudinally therethrough, means for keeping the said sleeve stationary when the rotary nut is being actuated by the pointing hand wheel, and means for keeping the rotary nut stationary when the said sleeve is being actuated by the ranging hand wheel.

In testimony whereof I affix my signature in presence of two witnesses.

GEORGE THOMAS BUCKHAM.

Witnesses:
JOHN J. SHIELDS,
ARCHIE H. NICHOLS.

Copies of this patent may be obtained for five cents each, by addressing the "Commissioner of Patents, Washington, D. C."